United States Patent [19]

Laker

[11] Patent Number: 4,572,257

[45] Date of Patent: Feb. 25, 1986

[54] APPARATUS FOR PROFILING REEDS FOR DOUBLE-REED MUSICAL INSTRUMENTS

[76] Inventor: Edward B. Laker, 2116 Cook Pl., Ramona, Calif. 92065

[21] Appl. No.: 671,094

[22] Filed: Nov. 13, 1984

[51] Int. Cl.⁴ .......................... B27C 1/14; B27C 5/06
[52] U.S. Cl. ................................. 144/115; 144/2 R; 144/142; 144/144 R
[58] Field of Search .......... 144/2 R, 115, 142, 144 R, 144/372

[56] References Cited

U.S. PATENT DOCUMENTS

| | | | |
|---|---|---|---|
| 2,204,871 | 8/1938 | Strano et al. | 144/142 |
| 2,664,122 | 12/1953 | Allen, Sr. | 144/144 R |
| 3,739,824 | 6/1973 | Hoenig | 144/144 R |
| 4,231,404 | 11/1980 | Van Doren et al. | 144/2 R |
| 4,273,170 | 6/1981 | Herzberg et al. | 144/115 |

OTHER PUBLICATIONS

"The Oboe Reed Book" by Jay Light, Copyright 1983.

Primary Examiner—W. D. Bray
Assistant Examiner—Jorji M. Griffin
Attorney, Agent, or Firm—Brown, Martin & Haller

[57] ABSTRACT

A hand-operated precision profiling tool for use in fabricating double-reed mouthpieces for double-reed musical instruments employs a reed support that is rotatably mounted on a base adjacent a manually-operated cutting assembly. The reed support holds a section of reed stock and a profiling template in fixed alignment for rotation about a common axis. The cutting assembly, comprising a blade and a stylus on a movable carriage, shaves a selected portion of the reed stock with strokes of the carriage parallel to the common axis, the stylus tracing the contour of the template as the blade shaves the reed stock accordingly. A handwheel enables hand rotation of the reed support within predetermined limits to select the portion shaved, and the reed support may include separate oboe and english horn nests on opposite sides to enable use for either size reed.

9 Claims, 8 Drawing Figures

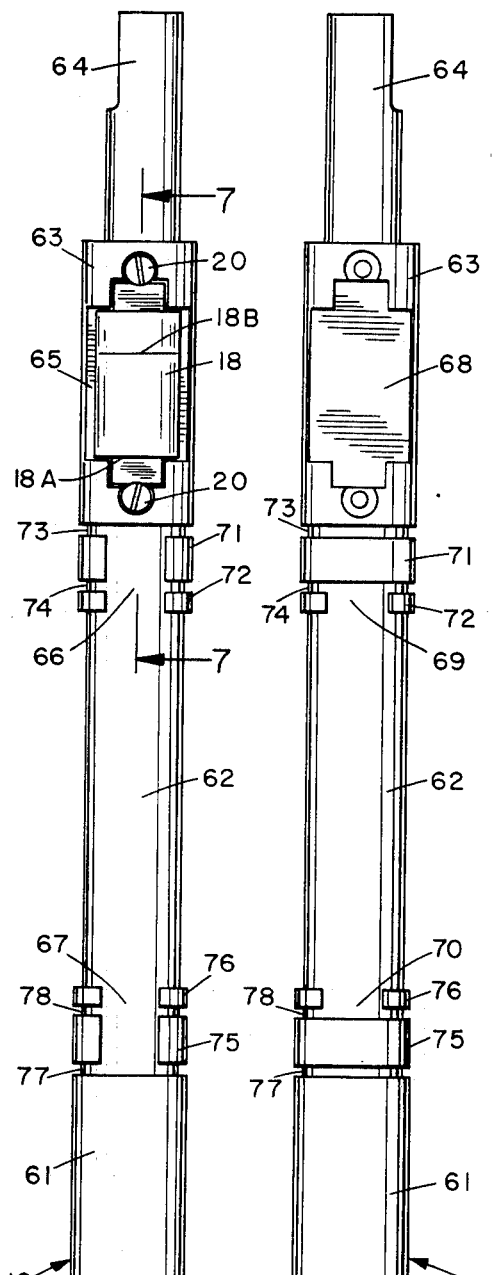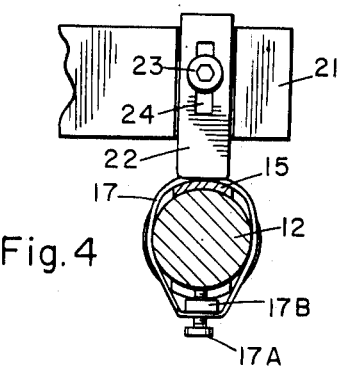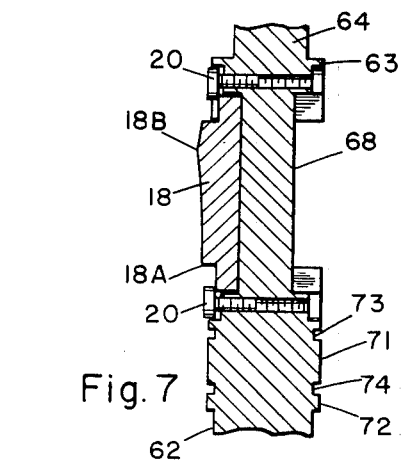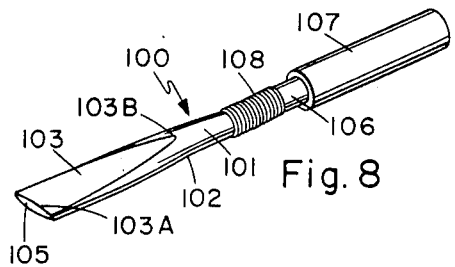
Fig. 4
Fig. 5
Fig. 6
Fig. 7
Fig. 8

APPARATUS FOR PROFILING REEDS FOR DOUBLE-REED MUSICAL INSTRUMENTS

BACKGROUND OF THE INVENTION

Some wood-wind musical instruments such as the oboe, english horn, and bassoon employ a special kind of mouthpiece having two reeds. In view of this characteristic, the instruments are commonly called double-reed instruments, and the mouthpiece a double-reed mouthpiece.

Much like a single-reed mouthpiece as the source of sound on a single-reed instrument, the double-reed mouthpiece supplies the sound for double-reed instruments. Passage of the musician's breath over the reeds sets them into vibration, and when this is skillfully done, the double-reed wood-winds come alive with the music we know.

But beyond this similarity, the double-reed mouthpiece is quite different, and one of the most important differences is the fabrication process. This invention relates to the fabrication process and to devices used in performing a particular step in that process, the step of profiling reeds.

Profiling reeds refers to the process of shaping the reeds so that the fully assembled mouthpiece has the desired profile, that is, the desired shape and thickness. Mouthpiece performance is critically dependent upon these attributes, and precise profiling is essential. So important is the profile of the reed that musicians can have templates made of the precise profile they prefer. The contour of these templates are followed as a pattern during the profiling operation.

A fully assembled double-reed mouthpiece includes two carefully shaped reeds held together in precise alignment. The reeds lie almost flat against each other, with just enough space between them for passage of the musician's breath. The reeds are held in this position by attachment at one end to a "staple" made up of a tube passing through a piece of cork that plugs into the instrument. The other end of the reeds, the "crow", remains free for placement between the musician's lips. It is the crow that must be precisely profiled.

Thin elastic reed cane, such as that grown in the Mediterranean area, supplies the reed stock from which the reeds are formed. Both reeds are usually formed from a single section of reed stock; one-half of the reed stock is shaped to form one of the reeds, and the other half is shaped to form the other reed. The two reeds join together at the center of the reed stock, along what will become the tip of the crow.

Once the section of reed stock has been shaped to the desired profile (profiled), it is folded at the center so that the two reeds lie almost flat against each other. Excess material is removed and the reeds are tied onto a staple. The tip of the crow is then trimmed to separate the two reeds from one another, and a fully assembled doublereed mouthpiece results.

Three different sizes are most commonly made, the size of the mouthpiece corresponding to the instrument on which it will be used. The oboe mouthpiece is the smallest, the english horn mouthpiece only slightly larger, and the bassoon mouthpiece a good deal larger. These different sizes, in combination with the delicate physical structure of the mouthpiece and the customized profile variations sought by individual musicians, make the fabrication of double-reed mouthpieces a real art and the use of appropriate tools highly desirable.

Various tools for performing the profiling operation exist in the prior art. For example, U.S. Pat. No. 4,273,170 of Herzberg et al. describes a precision reed trimming machine for use in trimming reed material for bassoons. The Herzberg device employs a section of reed material on a reed support that is rotatable about one axis, and a template on a cam assembly that is rotatable about another axis.

This device suffers from certain drawbacks. In the first place, it is designed for the larger, easier-to-handle bassoon reeds, and it is in many respects awkward and ineffective for the smaller reeds used on the oboe and english horn. Secondly, the template and reed material are rotatable about different axes. This results in less precise control of the profiling operation. Also, the Herzberg device requires more complicated mechanical structure to synchronize rotation of the reed support with rotation of the cam assembly, and this leaves more room for error.

Consequently, it is desirable to have a new apparatus for profiling reeds for double-reed instruments.

It is desirable that the apparatus be suitable for profiling the smaller reeds used on the oboe and english horn.

It is desirable that the apparatus enable more precise profiling, and that it avoid the complicated mechanical structure of the prior art.

SUMMARY OF THE INVENTION

This invention recognizes the problems of the prior art and provides a new and improved apparatus with the desired attributes.

A hand-operated apparatus is disclosed for profiling a given section of reed stock according to the contour of a given profiling template, the reed stock and the template being supported in fixed alignment for rotation about a single axis.

An exemplary embodiment of the apparatus employs a reed support rotatably mounted on a base. The reed support includes means for holding the template and the reed stock in fixed alignment for rotation about a common axis.

A manually-operated cutting assembly is also mounted on the base, adjacent the reed support. The cutting assembly includes means for shaving a selected portion of the reed stock with strokes generally parallel to the common axis according to the contour of a corresponding portion of the template. The reed support can be rotated by hand in order to select the portion shaved.

One embodiment includes a carriage, blade, and stylus combination that can be moved in strokes generally parallel to the common axis, the stylus tracing the contour of the template as the blade shaves the reed stock accordingly.

With less complicated mechanical structure and with the section of reed stock and profiling template held in fixed alignment for rotation about a common axis, the apparatus enables hand profiling of the smaller oboe reed and the slightly larger english horn reed with ease and precision.

This and other objects and many attendant advantages of the invention will become more fully apparent upon a reading of the detailed description in conjunction with the drawings wherein like numerals refer to like components throughout.

BRIEF DESCRIPTION OF THE DRAWINGS

Further details of the invention are discussed with reference to the drawings, wherein:

FIG. 4 is an enlarged sectional view taken on line 4—4 of FIG. 1;

FIG. 5 is an enlarged top plan view of the reed support, with a template in place;

FIG. 6 is an underside view of the reed support;

FIG. 7 is a sectional view taken on line 7—7 of FIG. 5; and

FIG. 8 is a perspective view of a typical finished double-reed mouthpiece.

DETAILED DESCRIPTION

Figure 1:
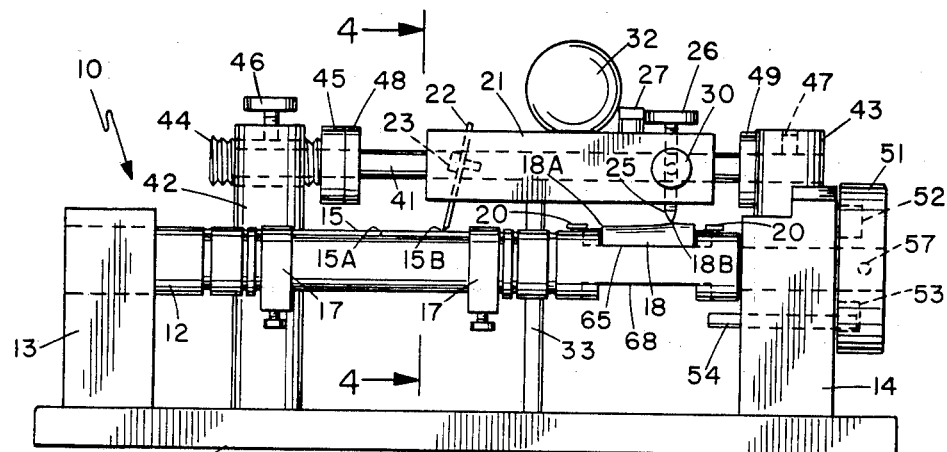
FIG. 1 is a side elevation view of an apparatus for profiling reeds that is constructed in accordance with the invention.
Figure 2:
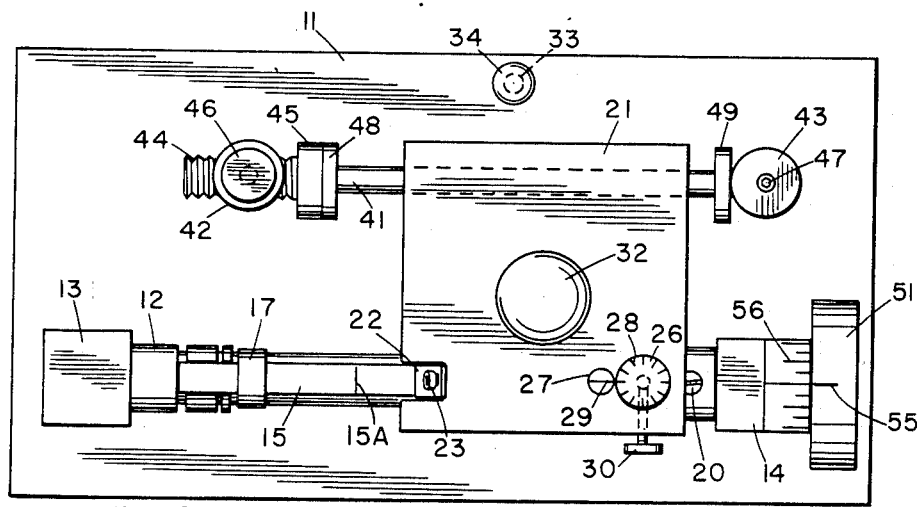
FIG. 2 is a top plan view thereof.
Figure 3:
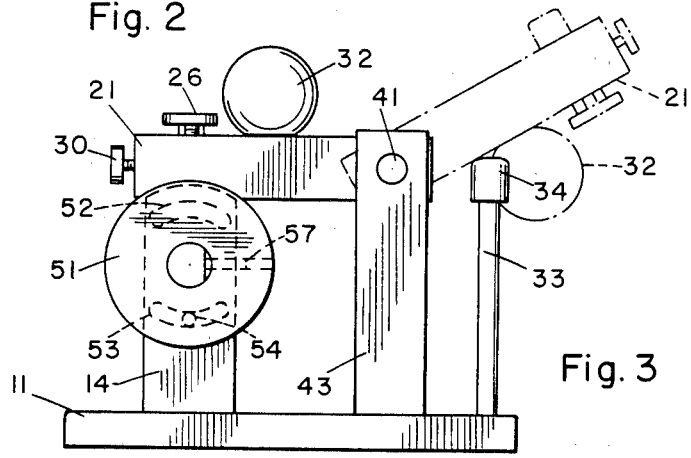
FIG. 3 is an end elevation view as taken from the right end of FIG. 1.

An apparatus constructed in accordance with the invention is illustrated in FIGS. 1-3. It is referred to generally in FIG. 1 by reference numeral 10 and shown to include a base plate 11 on which is rotatably mounted a reed support 12. The base plate is a solid metal plate suitable for supporting the other components, and the reed support is an elongated member mounted on the base so that it can be rotated about its longitudinal axis. Reed support 12 is suitably journalled in post 13 and post 14 for this purpose, its longitudinal axis (rotational axis) extending from one post to the other, and the posts are rigidly mounted on the base plate by suitable means such as machine screws through holes in the base plate into the posts.

The reed support serves the function of supporting a given section of reed stock and a given profiling template in fixed alignment for rotation about a common axis, that is, the rotational axis of the reed support. The section of reed stock and profiling template are "given" in that they are separate from the profiling apparatus of this invention, the section of reed stock being a separately-supplied workpiece and the profiling template being a separately-supplied pattern.

The reed support is shaped and dimensioned to accomodate both a section of reed stock about 2.9 inches long for use on an oboe mouthpiece, and a section about 3.7 inches long for use on an english horn mouthpiece.

Reed support 12 is shown supporting reed stock 15. The center of the reed stock, reed stock center 15A, is properly aligned as will be discussed later, and the reed stock is clamped to the reed support with clamps 17.

Reed support 12 is also shown supporting profiling template 18 (FIG. 1). The profiling template is a typical metal plate shaped with a contour suitable for use as a pattern in the profiling operation. The contour used as a pattern extends from a tip end 18A, corresponding to the tip of the crow on a completed double-reed mouthpiece, to a staple end 18B, corresponding to the staple end of the crow. Suitable means such as template lock screws 20 secure the template to the reed support.

The profiling template may be secured to the reed support first, and the section of reed stock then secured with reed stock center 15A and tip end 18A being separated by a specific distance so that the profiling operation results in the tip of the crow being formed at the approximate center of the reed stock, and the staple end of the crow being formed at point 15B, corresponding to staple end 18B of the profiling template. The illustrated reed support includes template nests and separate oboe and english horn nests to facilitate this fixed alignment, as will be discussed later with reference to FIGS. 5 and 6.

A cutting assembly is also mounted on the base plate adjacent the reed support. The cutting assembly includes manually-operated means for shaving a selected portion of the reed stock with strokes generally parallel to the common axis (the rotational axis of the reed support) according to a corresponding portion of the template. The illustrated embodiment includes carriage 21 on which is adjustably mounted blade 22 by suitable means such as blade lock screw 23. A blade suitable for shaving material from the reed stock is employed.

A stylus with which to trace the profiling template is also adjustably attached to carriage 21 by suitable means such as a threaded stylus through a tapped hole. The illustrated embodiment includes threaded stylus 25 having a stylus adjustment knob 26 adjacent index post 27. The position of the stylus may be adjusted by turning the stylus adjustment knob, and then set in position by suitable locking means such as stylus lock screw 30 (FIGS. 1-3).

In the illustrated embodiment, stylus adjustment knob 26 includes graduations 28 for use in conjunction with index mark 29 on the index post (FIG. 2) to indicate relative position of the knob. The index post may be shaped to define an index mark in the general position illustrated, or an index mark can be added to it.

The stylus and blade are adjusted to the correct position as an initial step in the profiling operation. A given profiling template and a given section of reed stock are first secured to the reed support. Then the blade is adjusted so that it rests upon the section of reed stock with the carriage substantially parallel to the base. Finally, the height of the stylus is adjusted so that it barely touches the staple end 18B of the profiling template.

As the reed stock is shaved with strokes of the carriage generally parallel to the common axis, stylus 25 can be adjusted slightly in height if desired so that the blade cuts more deeply into the reed stock. This allows for adjustment according to the thickness of the reed stock.

Carriage 21 also includes hand knob 32 which can be grasped with the fingers of one hand to manually move the carriage while the base is steadied with the other hand. Thus, by grasping the knob and moving the carriage with strokes generally parallel to the common axis, a selected portion of the reed stock can be precisely shaved according to the corresponding portion of the profiling template.

One aspect of the invention includes means for enabling the carriage to be manually moved to shave the reed stock with strokes generally parallel to the common axis as the stylus traces the template and the blade shaves the reed stock accordingly. In the illustrated embodiment, carriage support shaft 41 is mounted above the base generally parallel to the common axis, with the carriage being slidably mounted on the carriage support shaft by suitable means such as by the carriage support shaft extending through a hole in the carriage. This enables manual movement of the carriage generally parallel to the common axis. It also enables pivoting of the carriage about the carriage support shaft so that the blade and stylus can move radially with respect to the common axis to vary the depth that the blade shaves the section of reed stock. In the illustrated embodiment carriage support shaft 41 is journalled within first carriage support post 42 and second carriage support post 43 (FIGS. 1 and 2), and these support posts are rigidly mounted on base 11 with suitable means such as machine screws through holes in the base plate into the support posts. A hollow threaded sleeve 44 having a flange 45 screws into first carriage support post 42 where it is retained in an adjustable position by suitable means such as thumb screw 46. Carriage support shaft 41 fits within the hollow threaded sleeve and extends to second carriage support post 43 in which it is suitably journalled and held in place by means such as set screw 47.

Mounted in this manner the carriage support shaft provides a shaft along which the carriage can be slid generally parallel to the rotational axis of the reed support, and thus it enables the carriage to be manually moved to shave the reed stock with strokes generally parallel to the common axis as the stylus traces the template and the blade shaves the reed stock accordingly.

A washer-like bumper, rubber bumper 48 in place on the shaft adjacent flange 45 absorbs the shock of the carriage coming to a stop at that point. Sleeve 44 can be adjusted in position relative to the first carriage support post to vary the position at which the carriage stops. This serves to limit movement of the carriage so that the blade does not shave beyond reed stock center 15A. Rubber bumper 49 is used on the shaft adjacent second carriage support post 43 for absorbing shock on the back stroke.

Thus, the carriage can be slid along the carriage support shaft and also pivoted about the carriage support shaft. This allows the stylus and blade to move substantially perpendicular to the common axis so that the depth to which the blade shaves the reed stock can vary according to the contour traced by the stylus.

The carriage can also be pivoted out of the way about carriage support shaft 41 to enable better access to the reed support. This is illustrated in FIG. 3 where the carriage is drawn in phantom lines in a fully-pivoted position. In this fully-pivoted position the carriage rests against rubber cap 34 on carriage stop post 33, the carriage stop post being a metal post rigidly mounted on base 11 by suitable means such as a threaded end of the stop post screwed into a tapped hole in the base.

The invention includes means for enabling manual rotation of the reed support about the common axis to select the portion shaved. In addition to the reed support being rotatably mounted, the illustrated embodiment includes a handwheel 51 mounted on the reed support for this purpose. The handwheel can be operated by hand to rotate the reed support to a desired position.

The handwheel includes first stop-pin groove 52 and second stop-pin groove 53 (FIGS. 1 and 3). These grooves combined with stop-pin 54 (FIGS. 1 and 3) to limit rotation of the hand wheel, and thereby the reed support, to preselected limits, the preselected limits corresponding to the points at which the stop-pin abuts the handwheel at each end of the grooves. Stop pin 54 removably extends with a friction fit through post 14 into one of the grooves, and it limits rotation beyond the limits defined by the groove. In the illustrated embodiment, each groove extends in an arc of approximately 60 degrees, and this limits rotation to approximately 30 degrees on each side of a center point. This amount of rotation is sufficient to shave a section of reed stock according to a profiling template.

The stop-pin is held in place by a friction fit so that it can be withdrawn from the groove by hand to enable rotation of the handwheel a full 180 degrees. This may be desirable in order to shape a section of reed stock mounted on the opposite side of the reed support as will be discussed subsequently. A friction fit of stop-pin 54 is found sufficient since any vibrations are generally inadequate to jar it loose. However, means for retaining the stop-pin in place may be employed, such as a slight enlargement on the end of the stop-pin that extends into the handwheel grooves.

The illustrated handwheel also includes handwheel index mark 55 for use in conjunction with handwheel indexing graduations on post 14 to designate the position of the reed support and the corresponding portion of the reed stock being shaved. A representative graduation is designated reference numeral 56 in FIG. 2. Finally, the handwheel is removably mounted with suitable means such as set screw 57 in FIGS. 1 and 3.

Further details of the blade relative to the reed stock are shown in FIG. 4. Slot 24 in blade 22 permits adjustment by loosening blade lock screw 23 and sliding the blade to the desired position. The blade rests upon the section of reed stock as shown. It is adjusted to this position and then the stylus is adjusted to barely touch the staple end of the profiling template.

FIG. 4 also illustrates how clamp 17 may include suitable clamping means such as the combination of clamping screw 17A and clamp nut 17B.

FIGS. 5 and 6 illustrate further details of the reed support. Reed support 12 is approximately 8.6 inches long and it consists of three major portions, far-end portion 61 (about 0.75 inch in diameter), middle portion 62 (about 0.69 inch in diameter), template portion 63 (about 0.75 inch in diameter), and handwheel-shaft portion 64 (about 0.5 inch in diameter). Far-end portion 61 is the portion rotatably journalled in post 13. Middle portion 62 is the portion on which a given section of reed stock is supported. Template portion 63 is the portion in which a given profiling template is supported. And handwheel-shaft portion 64 is the portion suitably journalled through post 14 to which handwheel 51 is removably attached.

In the template portion of the reed support is located english horn template nest 65 (FIG. 5). This nest is a recess that is shaped and dimensioned to receive an english horn template, such as profiling template 18 represents in FIG. 5. As shown in FIG. 5 the profiling template is mounted with the staple end toward the handwheel-shaft portion and the tip end toward the center portion. The nest retains the profiling template in desired alignment with the reed support, and therefore in desired alignment with the section of reed stock.

The center portion includes first english horn nest 66 and second english horn nest 67. A section of reed stock having a length suitable for use for an english horn mouthpiece will extend into these nests. This enables use of a length of reed stock of the appropriate width (about (about 3.7 inches). These nests also serve in combination with clamps 17 to hold the reed stock in fixed alignment with the profiling template.

English horn nests 66 and 67 are recesses machined in the positions shown. First english horn nest 66 extends through first outer ring 71 and first inner ring 72. First outer milling groove 73 and first inner milling groove 74 serve as machining expedients in the construction of the illustrated reed support. These grooves help machine square corners. First outer milling groove 73 serves as a machining expedient in making sharp corners on first outer ring 71 adjacent the template nest. First inner milling groove 74 serves this same purpose on the opposite side of the reed support for first inner ring 72 as will be discussed later.

Similarly, second english horn nest 67 extends through second outer ring 75 and second inner ring 76. Second outer milling groove 77 serves as a machining expedient in making sharp corners on second outer ring 75, and second inner milling grove 78 serves the same purpose on the opposite side of the reed support for second inner ring 76 as will be subsequently discussed.

FIG. 6 shows the opposite side of the reed support. On this side of the reed support template nest portion 63 defines an oboe template nest 68. This nest is suitably shaped and dimensioned to receive an oboe profiling template, both the oboe and the english horn profiling templates typically being the same general size (roughly 1.25 inch long by 0.375 inch wide).

This side of the reed support includes first oboe nest 69 and second oboe nest 70. These two nests are the counterpart of the english horn nests. However, they do not extend as far. They only extend up to first outer ring 71 and second outer ring 75 because an oboe mouthpiece employs a shorter section reed stock than does an english horn (about 2.937 inches long). Oboe nests 69 and 70 serve the same type of function as the english horn nests. They enable precutting of the reed stock to a length suitable for use on an oboe mouthpiece and they combine with clamps 17 to hold the reed stock in fixed alignment with the profiling template secured in template nest 68.

First inner milling groove 74 and second inner milling grove 78 serve as a machining expedient for obtaining sharp corners on first inner ring 72 and second inner ring 76.

Thus, the illustrated embodiment includes a precision reed support for supporting a given profiling template and a given section of reed stock in fixed alignment for rotation about a common axis, the reed support being suited for use in profiling reeds for both an oboe mouthpiece and an english horn mouthpiece.

Further details of the template nests are shown in FIG. 7. Profiling template 18 is shown in place in the english horn template nest. On the opposite side of the reed support, there is defined an oboe template nest (shown with no profiling template in it since usually only one template would be in place on the reed support at any one time). These nests are shaped and dimensioned to receive typical profiling templates, and they are positioned on the reed support so that the blade is at the approximate center of a given section of reed stock when the stylus is on the tip end of a given profiling template.

A fully assembled double-reed mouthpiece is illustrated in FIG. 8 where it is designated generally by reference numeral 100. Reeds 101 and 102 lie almost flat together, crow 103 of reed 101 being shown extending from tip end 103A to staple end 103B. The tips of the reeds are slightly separated to define an air passageway 105 through which the musician's breath passes, and at the other end of the mouthpiece there is a hollow brass sleeve 106 that extends through a cork 107. The reeds are tied to the brass sleeve with tying 108, the cork then plugging into a double-reed instrument. The crow is placed between the musicians lips and it is this section that is precisely profiled.

Although for the purposes of this application, the crow is shown in FIG. 8 extending the full distance from tip end 103A to staple end 103B, "crow" is often even more precisely used in connection with the profiling of reeds to refer to the portion of the reed immediately adjacent tip end 103A. This fact, other nomenclature, and steps often employed in the fabrication of double-reed mouthpieces are set forth in "The Oboe Reed Book" by Jay Light, Drake University, Des Moines, Iowa, Library of Congress Catalogue Card Number 83-90562, this publication being incorporated herein by reference.

As various changes may be made in the form, construction, and arrangement of the procedures and parts described herein, without departing from the spirit and scope of the invention and without sacrificing any of its advantages, it is to be understood that all matter herein is to be interpreted as illustrative and not in any limiting sense.

What is claimed is:

1. An apparatus for profiling a given section of reed stock according to the contour of a given profiling template, which comprises:

a base;

a reed support rotatably mounted on the base, the reed support including means for supporting a given profiling template and a given section of reed stock in fixed alignment for rotation about a common axis;

a cutting assembly mounted on the base adjacent the reed support, the cutting assembly including manually-operated means for shaving a selected portion of the section of reed stock with strokes generally parallel to the common axis according to a corresponding portion of the profiling template; and means for enabling manual rotation of the reed support about the common axis to select the portion shaved.

2. The apparatus recited in claim 1 wherein the reed support includes means for defining an english horn nest on the reed support in which to support a section of reed stock that has a length suitable for an english horn reed.

3. The apparatus recited in claim 1 wherein the reed support includes means for defining an oboe nest on the reed support in which to support a section of reed stock that has a length suitable for an oboe reed.

4. The apparatus recited in claim 3 wherein the reed support includes both means for defining both an oboe nest and means for defining an english horn nest on the reed support.

5. The apparatus recited in claim 1, which includes means for limiting rotation of the reed support to preselected limits.

6. The apparatus recited in claim 1, further comprising:

a carriage movably mounted on the base, the carriage including a stylus with which to trace the profiling template, and a blade with which to shave the section of reed stock; and means for enabling the carriage to be manually moved to shave the section of reed stock with strokes generally parallel to the common axis as the stylus traces the profiling template and the blade shaves the section of reed stock accordingly.

7. The apparatus recited in claim 6 which includes means for limiting movement of the carriage to prevent shaving beyond a center point of the reed stock.

8. The apparatus recited in claim 6 which includes means for adjusting the relative positioning of the blade and the stylus.

9. The apparatus recited in claim 6 which includes means for enabling the carriage to be manually moved generally parallel to the common axis at a distance from the common axis that varies slightly according to the position of the stylus on the template.

* * * * *